US010592270B2

(12) United States Patent
Brewerton et al.

(10) Patent No.: US 10,592,270 B2
(45) Date of Patent: Mar. 17, 2020

(54) SAFETY HYPERVISOR FUNCTION

(71) Applicant: Infineon Technologies AG, Neubiberg (DE)

(72) Inventors: Simon Brewerton, Trowbridge (GB); Glenn Farrall, Bristol (GB); Neil Hastie, Lydney (GB); Frank Hellwig, Munich (DE); Richard Knight, Stroud (GB); Antonio Vilela, Mering (DE)

(73) Assignee: Infineon Technologies AG, Neubiberg (DE)

( * ) Notice: Subject to any disclaimer, the term of this patent is extended or adjusted under 35 U.S.C. 154(b) by 109 days.

(21) Appl. No.: 15/784,528

(22) Filed: Oct. 16, 2017

(65) Prior Publication Data
US 2018/0039508 A1 Feb. 8, 2018

Related U.S. Application Data

(62) Division of application No. 14/206,033, filed on Mar. 12, 2014, now Pat. No. 9,836,318.
(Continued)

(51) Int. Cl.
| G06F 12/00 | (2006.01) |
| G06F 9/455 | (2018.01) |
| G06F 21/71 | (2013.01) |
| G06F 21/85 | (2013.01) |
| G06F 9/30  | (2018.01) |
(Continued)

(52) U.S. Cl.
CPC ...... *G06F 9/45558* (2013.01); *G06F 9/30043* (2013.01); *G06F 13/28* (2013.01); *G06F 21/71* (2013.01); *G06F 21/85* (2013.01); *G06F 2009/45583* (2013.01); *G06F 2009/45587* (2013.01)

(58) Field of Classification Search
CPC ................................ G06F 11/00; G06F 12/00
USPC ......................................................... 710/308
See application file for complete search history.

(56) References Cited

U.S. PATENT DOCUMENTS 3,858,182 A 12/1974 Delagi et al.
4,589,066 A 5/1986 Lam et al.
(Continued)

FOREIGN PATENT DOCUMENTS

CN 1447228 A 10/2003
CN 101535956 A 9/2009

OTHER PUBLICATIONS

Supplemental Notice of Allowance dated Sep. 5, 2017 for U.S. Appl. No. 14/206,033.
(Continued)

*Primary Examiner* — Christopher B Shin
(74) *Attorney, Agent, or Firm* — Eschweiler & Potashnik, LLC

(57) ABSTRACT

The disclosure relates to systems and methods for defining a processor safety privilege level for controlling a distributed memory access protection system. More specifically, a safety hypervisor function for accessing a bus in a computer processing system includes a module, such as a Computer Processing Unit (CPU) or a Direct Memory Access (DMA) for accessing a system memory and a memory unit for storing a safety code, such as a Processor Status Word (PSW) or a configuration register (DMA (REG)). The module allocates the safety code to a processing transaction and the safety code is visible upon access of the bus by the module.

18 Claims, 4 Drawing Sheets

Related U.S. Application Data

(60) Provisional application No. 61/942,801, filed on Feb. 21, 2014.

(51) Int. Cl.
*G06F 13/28* (2006.01)
*G06F 11/00* (2006.01)

(56) References Cited

U.S. PATENT DOCUMENTS

| | | | |
|---|---|---|---|
| 5,237,609 A | 8/1993 | Kimura | |
| 2003/0233565 A1 | 12/2003 | Kim | |
| 2004/0177266 A1* | 9/2004 | Moyer | G06F 21/85 |
| | | | 713/189 |
| 2005/0028159 A1 | 2/2005 | Kodama et al. | |
| 2007/0006025 A1 | 1/2007 | Onozuka et al. | |
| 2008/0141266 A1 | 6/2008 | Hunt et al. | |
| 2008/0148048 A1* | 6/2008 | Govil | G06F 21/53 |
| | | | 713/164 |
| 2010/0011345 A1 | 1/2010 | Hickerson et al. | |
| 2010/0042980 A1* | 2/2010 | Wright | G06F 8/4443 |
| | | | 717/146 |
| 2010/0106948 A1* | 4/2010 | Bellows | G06F 13/28 |
| | | | 712/225 |
| 2010/0131729 A1* | 5/2010 | Fulcheri | G06F 12/1425 |
| | | | 711/163 |
| 2010/0186080 A1 | 7/2010 | Thanner et al. | |
| 2010/0281273 A1 | 11/2010 | Lee et al. | |
| 2011/0296212 A1 | 12/2011 | Elnozahy et al. | |
| 2013/0263129 A1* | 10/2013 | Adachi | G06F 9/45533 |
| | | | 718/1 |
| 2014/0223052 A1* | 8/2014 | Chavali | G06F 13/1605 |
| | | | 710/110 |
| 2014/0372719 A1* | 12/2014 | Lange | G06F 12/1491 |
| | | | 711/163 |
| 2015/0013008 A1* | 1/2015 | Lukacs | G06F 21/53 |
| | | | 726/24 |

OTHER PUBLICATIONS

Notice of Allowance dated Jul. 27, 2017 for U.S. Appl. No. 14/206,033.
Final Office Action dated Apr. 19, 2017 for U.S. Appl. No. 14/206,033.
Non-Final Office Action dated Dec. 1, 2016 for U.S. Appl. No. 14/206,033.

\* cited by examiner

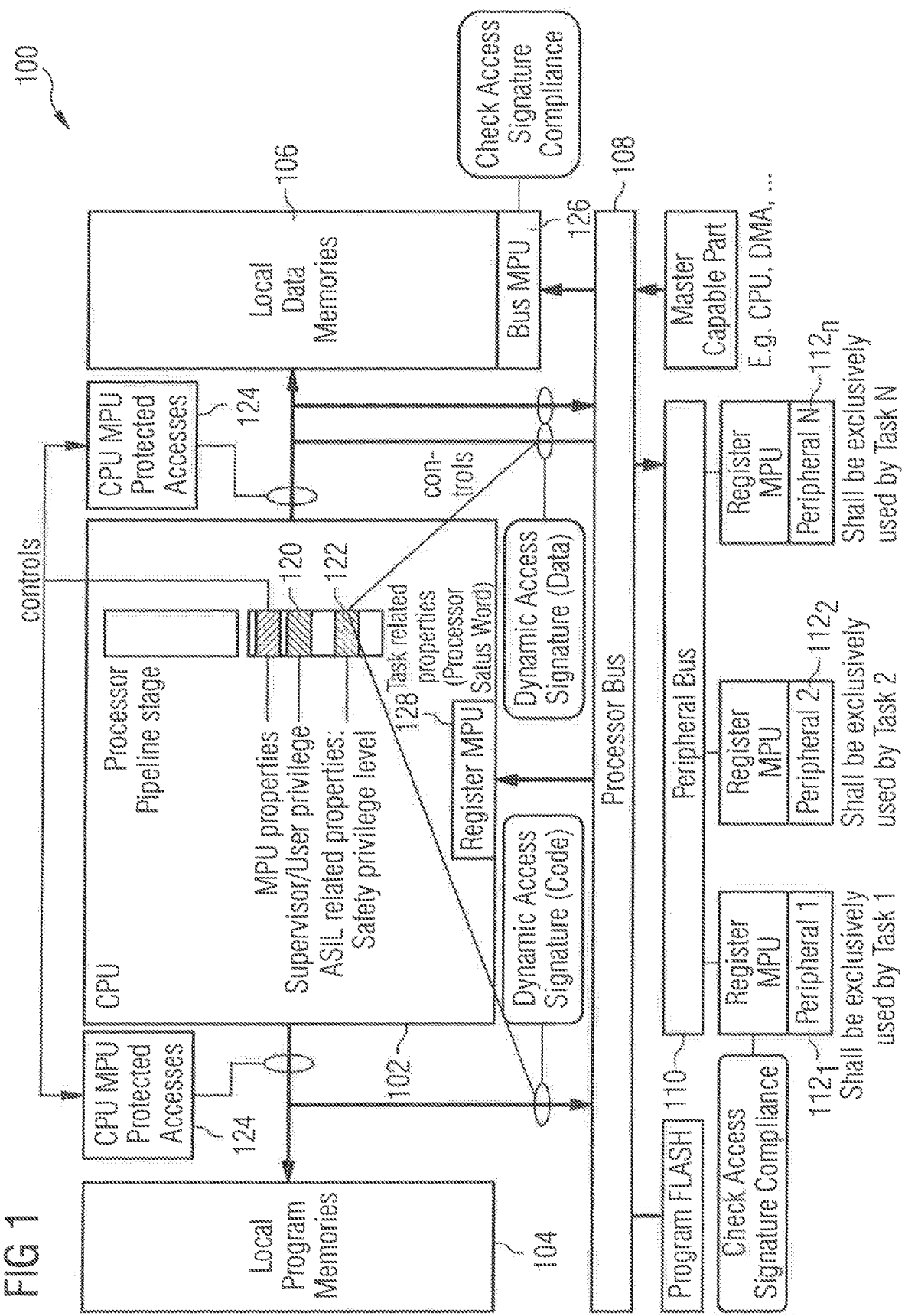

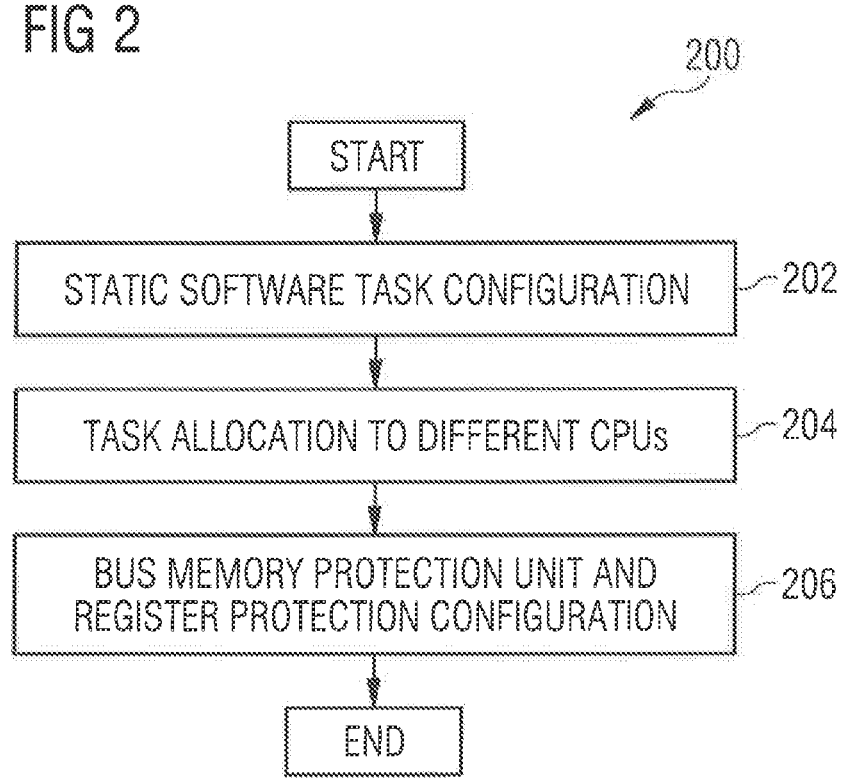

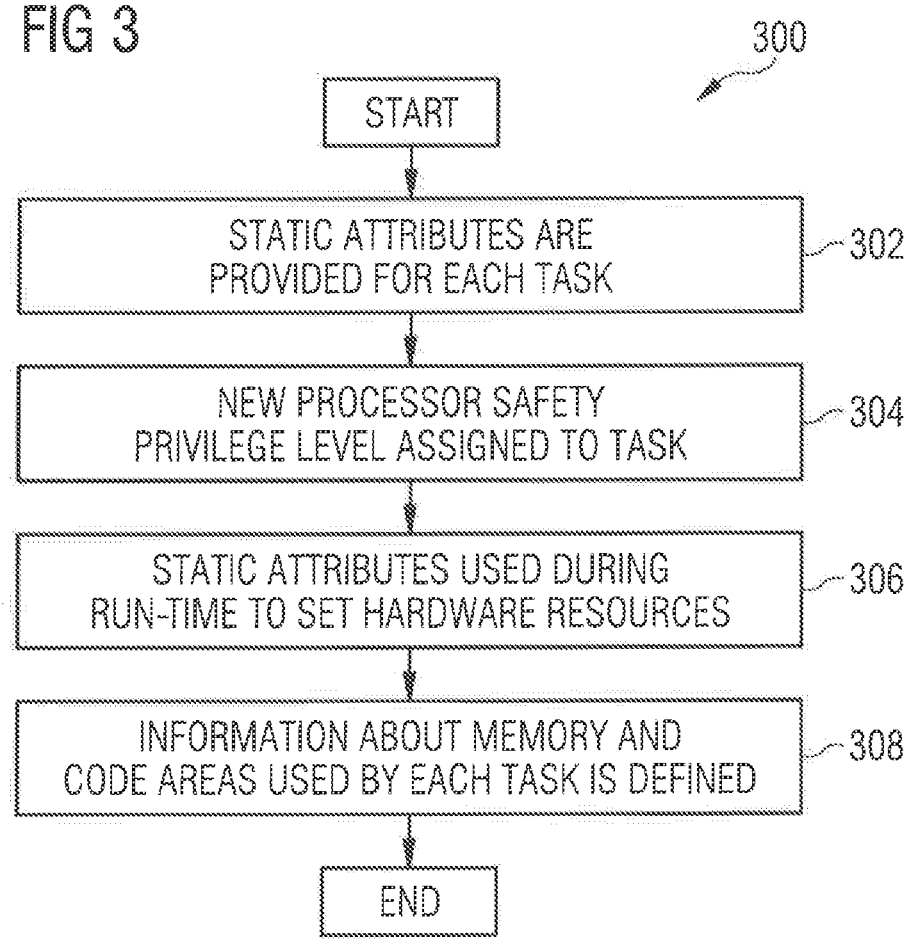
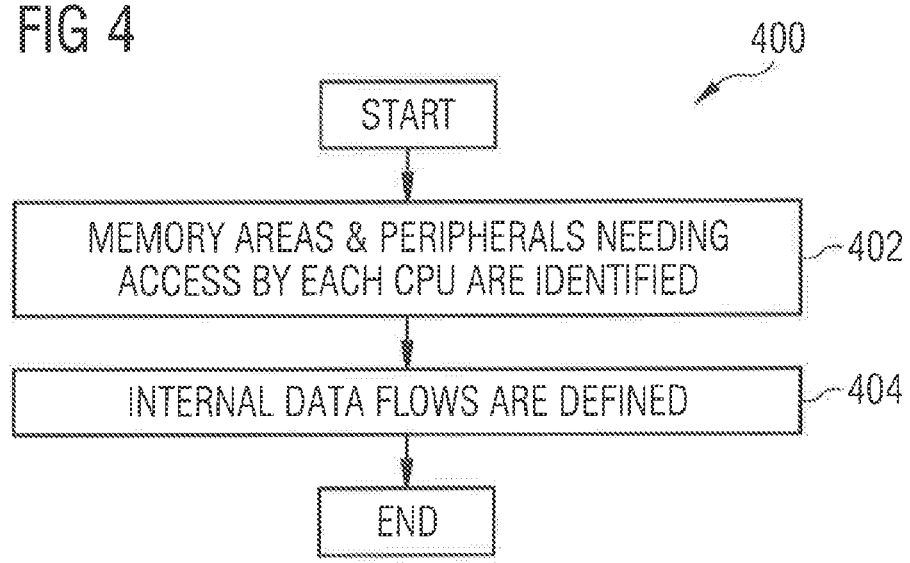

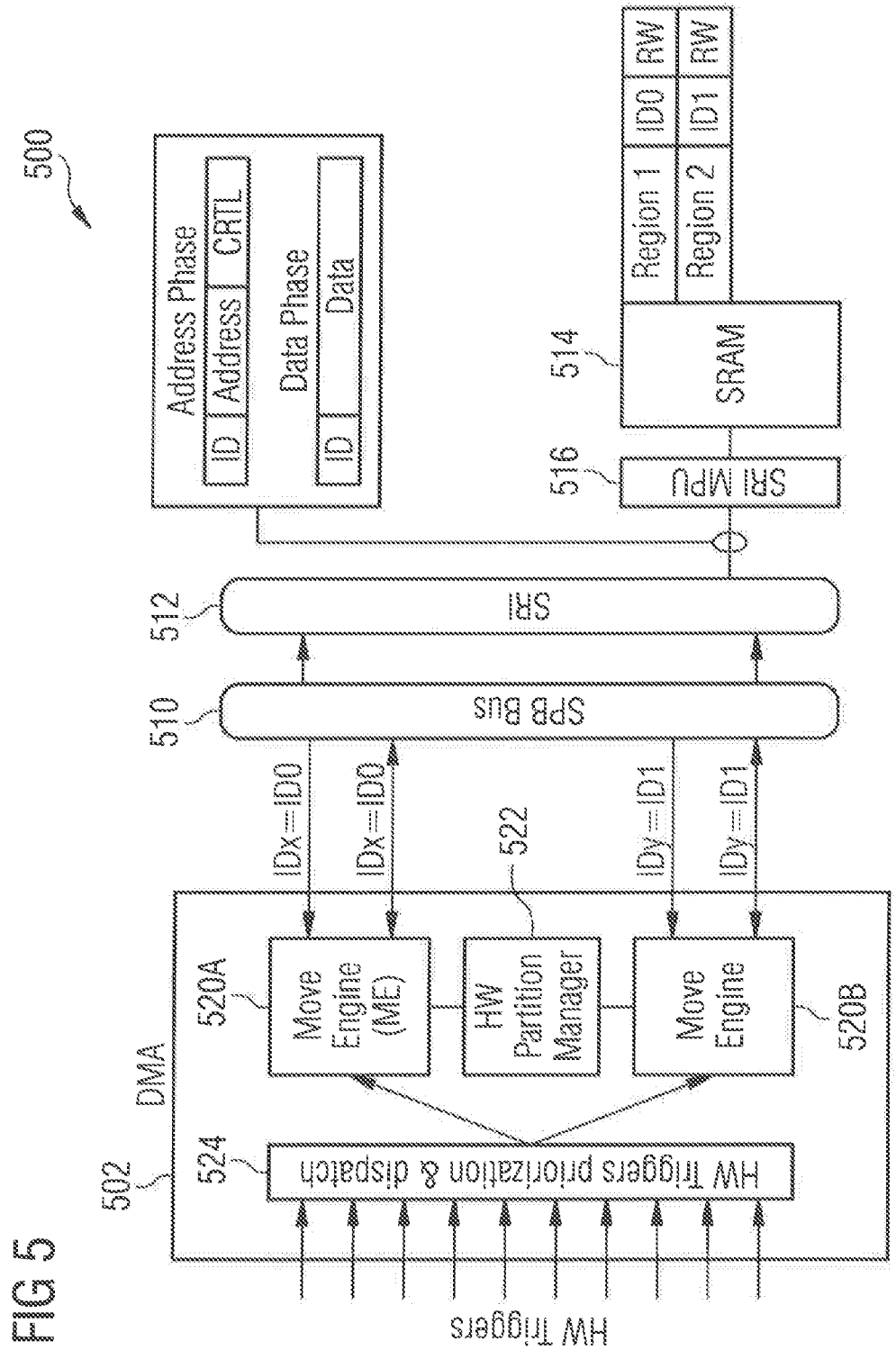

SAFETY HYPERVISOR FUNCTION

REFERENCE TO RELATED APPLICATION

This application is a Divisional patent application claiming priority to U.S. patent application Ser. No. 14/206,033 filed with the U.S. Patent and Trademark Office on Mar. 12, 2014, which claims prior to U.S. application No. 61/942,801 filed on Feb. 21, 2014, in the name of Simon Brewerton, et al. entitled "SAFETY HYPERVISOR FUNCTION" which is hereby incorporated in its entirety.

FIELD

The disclosure relates to methods and systems for safety functions for microcontrollers. More specifically, the disclosure relates to methods and systems for defining a processor safety privilege level for controlling a distributed memory access protection system.

BACKGROUND

Modern automotive electronic control units (ECUs) continue to integrate an increasing number of functions. This trend is driven by the technology scaling on one side, enabling a high level of integration, and by the highly cost driven nature of the automotive industry that forces reduction in the total number of ECUs per car. Electronics play an increasing role in providing advanced driving assistance functions and especially in preventing hazards that will reduce the number of fatal injuries.

The integration of functions inside an ECU is mainly concentrated around a safe microcontroller that plays a central role by hosting critical acquisition, computation and control functions. The ISO 26262 safety standard provides a way to qualify the criticality of the software involved in a safety application. In a first step through hazard and risk analysis, each function is ranked. This leads to an Automotive Safety Integrity Level (ASIL) for each safety goal. As a consequence, there is a complex set of heterogeneous software components that interact together to provide the intended functionality and integrity.

The privilege levels found in conventional embedded processors are no longer sufficient to fulfill the software encapsulation requirements inherent to the ISO 26262 safety standard. Additionally, the software encapsulation requirements should not be limited to the execution of software inside a CPU but should address all the resources inside a microcontroller. The absence of the proper hardware and software infrastructure to support these software encapsulation requirements requires the construction of significantly complex virtualization layers at the software level which in turn requires an incredibly complex software architecture and consumes a significant portion of the CPU performance. As a result, these deficiencies make it difficult to reach the level of integration expected by the ISO26262 standard and can be a limiting factor in using the possible software integration capabilities of modern CPUs.

Some conventional microcontrollers have tried implementing virtual layers in software so that access to any resource is controlled by a trusted software layer before it is sent to dedicated hardware resources. However, such software is very dependent on the hardware platform and creates a large system bottleneck as the number of software tasks increase.

Therefore, there exists a need for a system and method for a safety hypervisor function that is enabled in both hardware and software. More specifically, there is a need for a new privilege layer that can be specified to any task running in a microcontroller.

SUMMARY

In accordance with one aspect of the disclosure, a system for a safety hypervisor function for accessing a bus in a computer processing system comprises a module for accessing a system memory and a memory unit for storing a safety code. The module allocates the safety code to a processing transaction and the safety code is visible upon access of the bus by the module.

In one embodiment, a system for a safety hypervisor function in a computer system comprises a CPU Memory Protection Unit (CPU MPU) for protecting access to the CPU and local memories, a Bus Memory Protection Unit (Bus MPU) for protecting access to a processor bus, and a Register Memory Protection Unit (Register MPU) for protecting access to one or more peripherals in the system, wherein a safety privilege level is used by the CPU MPU, the Bus MPU and the Register MPU to determine access to the respective devices. In one embodiment, the safety privilege level is located in the Processor Status Word and may be either a safety bit or a safety code. The safety privilege level may also be configured when the system is designed and may be dynamically allocated by the operating system. The safety privilege level restricts access to on-chip transactions.

In accordance with another aspect of the disclosure, a method for performing a safety hypervisor function in a computer system comprises configuring static attributes for a software task, allocating the task to one of the CPUs, and configuring each bus memory protection unit and register protection needed by the task. In one embodiment, the method further comprises assigning a new processor safety privilege level to the task, using the static attributes during run time to set hardware resources, and defining the internal data flow.

Further features, aspects and advantages of the present disclosure will become apparent from the following detailed description of the disclosure made with reference to the accompanying drawings.

BRIEF DESCRIPTION OF THE DRAWINGS

The accompanying drawings are included to provide a further understanding of the present disclosure and are incorporated in and constitute a part of this specification. The drawings illustrate embodiments of the present disclosure and together with the description serve to explain the principles of the disclosure. Other embodiments of the present disclosure and many of the intended advantages of the present disclosure will be readily appreciated as they become better understood by reference to the following detailed description.

FIG. 1 shows an example schematic diagram of safety hypervisor function in accordance with one embodiment of the present disclosure.

FIG. 2 is a flowchart showing a method for performing a safety hypervisor function in accordance with one embodiment of the present disclosure.

FIG. 3 is a flowchart showing a method for performing a safety hypervisor function in accordance with one embodiment of the present disclosure.

FIG. 4 is a flowchart showing a method for performing a safety hypervisor function in accordance with one embodiment of the present disclosure.

FIG. 5 is an example schematic diagram of another embodiment of a safety hypervisor function for a Direct Memory Access (DMA).

DETAILED DESCRIPTION

In the following detailed description, reference is made to the accompanying drawings, which form a part hereof, and in which is shown by way of illustration specific embodiments in which the invention may be practiced. It is to be understood that other embodiments may be utilized and structural or other changes may be made without departing from the scope of the present disclosure. Therefore, the following detailed description is not to be taken in a limiting sense, and the scope of the present disclosure is defined by the appended claims.

FIG. 1 is an example schematic diagram of a hardware and software enabled safety hypervisor function 100 in accordance with one embodiment of the present disclosure. The present disclosure provides a distributed memory access protection system controlled by a new processor safety privilege level. The safety hypervisor function 100 comprises a CPU 102, local program memories 104, local data memories 106, a processor bus 108, a peripheral bus 110, and a plurality of peripherals $112_1$-$112_n$.

The CPU 102 further comprises a Processor Status Word (PSW) 120. In one embodiment, the PSW 120 contains the static task properties relevant for run-time execution. Typically, information related to a user/supervisor privilege level as well as a memory protection configuration can be found in the PSW. In one embodiment of the present disclosure, the PSW is extended with a new information field 122 that contains a safety privilege level. In one embodiment, the safety privilege level may be a safety bit. In another embodiment, the safety privilege level may be a code that identifies safety properties that are supported by the rest of the CPU architecture.

The present disclosure provides three different types of Memory Protection Units (MPUs): 1) at the CPU level (CPU MPU) 124, 2) at the bus level (Bus MPU) 126, and 3) at the register level (Register MPU) 128. The CPU MPU 124 is directly handled by the CPU to monitor the accesses to the tightly coupled memories, based on the task-level CPU MPU properties in the PSW 120. When a task performs accesses to a bus, an encoding of the safety privilege level (depending on the implementation the native information can be sent) is sent as a new property of the bus transaction. This can be achieved by extending the bus protocol or by adding some side band information with a timing compliant to the bus protocol phase where the information is used.

At the destination, the Bus MPU 126 or Register MPU 128 checks for the compliance of the safety privilege level encoding to its private configuration. The private configuration is the special safety code or identifier for accessing the particular device. A possible encoding can be achieved as follows: in a multi-master bus system, every master has a unique static identifier. The safety privilege level could be used to select an alternate identifier. Then at a destination the private configuration of the Bus or Register MPU would consist of the ability to configure one or several master identifiers that will be granted access to the protected resources. At the MPU level, the protection granularity can specify any of read-only, write-only or read/write attributes or a subset depending on the needs of the architecture.

As can be seen in FIG. 1, the safety privilege level is also used when software running on the CPU needs to configure its own registers. In another embodiment, the present disclosure can use the new safety privilege level as a new protection layer to protect its own critical registers, independent of the supervisor mode.

In another embodiment, the Register MPU 128 and the Bus MPU 126 are independent from the operating system in order to capture potential systematic failures that may arise during the configuration of the system, which is typically an extremely complex process, or inherent to the operating system software itself. In such situations, the operating system controls the CPU MPU 124 where all the other MPUs are configured independently of the operating system. An operating system malfunction during a CPU MPU reconfiguration could enable standard quality software to silently corrupt safety-related resources. For instance, because of some unspecified inputs a QM software could malfunction and arbitrarily try to access a safety-related memory area. In this case, the independent Bus MPU configuration would detect that the task does not propagate the intended safety privilege level and would deny access. Thus, the combination of the safety privilege level and its handling by the hardware units enable the present system to advantageously build an on-chip hypervisor that fulfills the new demands in terms of freedom of interference at the software and hardware levels.

FIG. 2 is a flowchart showing a method 200 for performing a safety hypervisor function in a distributed memory access protection system. For clarity, the method 200 for performing a safety hypervisor function is described in the context of the system 100. However, in alternate embodiments, other configurations may be used. Moreover, other embodiments may perform the acts described here in different orders and/or other embodiments may perform additional and/or different acts than those described here. At 202, the static configuration of the software task is performed. This static software task configuration is described in more detail below with respect to FIG. 3. Then, at 204, the tasks are allocated to different CPUs. This allocation is described below in more detail with respect to FIG. 3. Finally, at 206, based on the information from the static configuration and task allocation, each bus memory protection unit (MPU) and each register protection is configured.

FIG. 3 is a flowchart showing a method 300 for a static software task configuration. The static software task configuration is the first act in performing a safety hypervisor function. At 302 static attributes are provided for each task. In one embodiment, the operating system assigns each task these attributes. At 304 a new processor safety privilege level is assigned to each task. During this phase, each task is also given the User/Supervisor attribute in addition to the new processor safety privilege level. At 306, the static attributes are used during run time to set hardware resources. Finally, at 308 all the information about the memory and code areas used by each task are defined.

FIG. 4 is a flowchart showing a method for the CPU allocation for the different tasks. At 402 memory areas and peripherals needing access by each CPU for a particular task are identified. At 404, this information is used to define all internal data flows.

Thus, the safety hypervisor function of the present disclosure advantageously provides a new processor architecture enhancement by means of a new processor safety privilege level to support higher levels of protection to guarantee non-interference between heterogeneous software components with different safety integrity levels. This processor safety privilege level is independent from the traditional task identifier that is typically found in CPU architectures. For example, the Task ID may be used by the operating system where the safety privilege level is not used by the operating system as it enables monitoring of the operating system itself (within a functional scope that is). In other words, the present disclosure also advantageously enables independent monitoring of the operating system memory protection dynamic allocation and therefore ensures the intended freedom of interference at the hardware level as well.

Moreover, the present disclosure advantageously provides a scalable concept that enables a cost effective implementation by the scalability of the safety privilege level where the levels of protection can be configured. For example, the safety privilege level can be specified to differentiate between ASIL or non-ASIL software or between ASIL D and other software. Other implementations of the concept may enable to identify ASIL D, ASIL C, ASIL A and QM software by using more hardware resources.

Although the above description and related figures describe a safety hypervisor system in the context of a CPU, one skilled in the art will appreciate that the present disclosure may also be generalized to other computer system modules that can access a given bus as a master. In other words, a general system for a safety hypervisor function for accessing a bus in a computer system comprises a module for accessing a system memory and a memory unit for storing a safety code; wherein the module allocates the safety code to the processing transaction and wherein the safety code is visible upon access of the bus by the module. Thus, in another embodiment of the present disclosure, the module may comprise a Direct Memory Access (DMA) and a configuration register for storing the safety code for the DMA. In one embodiment, the safety code may be allocated to a DMA channel transaction.

FIG. 5 is an example schematic diagram of another embodiment of the present disclosure 500 comprising a Direct Memory Access (DMA) and a configuration register for storing the safety code for the DMA. The DMA safety hypervisor function 500 comprises a DMA 502, a SPB Bus 510, an SRI 512, an SRAM 514, and an SRI MPU 516. The DMA 502 further comprises at least one Move Engine (ME) 520, an HW Partition Manager 522, and a HW Triggers Prioritization & Dispatch Module 524. A ME 520 is dynamically allocated (according to priority parameters, etc.) to process a given DMA channel that is associated with a given HW trigger. The HW Partition Manager 522 enables and controls which ID is going to be used by a DMA Move Engine 520 for a given DMA channel during a bus transaction. A transaction in SPB 510 and SRI 512 is identified by an ID, and each Move Engine 520 has a unique ID. The SRI Memory Protection Unit (MPU) is configured so that only given DMA channels can write to SRAM Region 0 and only other given DMA channels can write to SRAM Region 1. Other masters or software can only read from Region 1 and Region 2.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A system that provides access protection, the system comprising:
    a computer processing unit (CPU) configured to encode a safety privilege level as a property of a transaction executed by the CPU, wherein the safety privilege level is indicative of safety properties suported by the CPU;
    a bus coupling the CPU to local data memory; and
    a bus memory protection unit (bus MPU) configured to:
        store a bus private configuration describing one or more authorized safety privilege levels for the bus;
        receive the transaction;
        identify the the safety privilege level encoded as the property of the transaction;
        compare the safety privilege level with the bus private configuration; and
        grant access to the local data memory in response to determining that the safety privilege level matches one of the authorized safety privilege levels for the bus.

2. The system of claim 1, wherein the CPU includes a register that stores the safety privilege level.

3. The system of claim 1, wherein the safety privilege level is a safety bit.

4. The system of claim 1, wherein the safety privilege level is a safety code.

5. The system of claim 1, wherein the safety privilege level is pre-determined.

6. The system of claim 1, wherein an operating system running on the CPU dynamically allocates the safety privilege level to one or more CPU hardware structures.

7. A system that provides access protection, the system comprising:
    a computer processing unit (CPU) configured to encode a safety privilege level as a property of a transaction executed by the CPU, wherein the safety privilege level is indicative of safety properties suported by the CPU;
    a register coupled to the CPU;
    a register memory protection unit (register MPU) configured to:
        store a register private configuration describing one or more authorized safety privilege levels for the register;
        receive the transaction;
        identify the the safety privilege level encoded as the property of the transaction;
        compare the safety privilege level with the register private configuration; and
        grant access to the register in response to determining that the safety privilege level matches one of the authorized safety privilege levels for the register.

8. The system of claim 7, wherein the register MPU is configured to compare the safety privilege level with a safety privilege level for a peripheral associated with the transaction.

9. The system of claim 8, wherein the register MPU is configured to grant access to the register based on the comparison of the safety privilege level for the task and the safety privilege level for the peripheral.

10. The system of claim 7, wherein the register MPU is configured to grant access having a protection granularity, wherein the protection granularity includes one of read-only, write-only, and read/write.

11. The system of claim 7, wherein the register MPU grants access corresponding to one of read only, write only, and/or read/write.

12. The system of claim 7, further comprising a peripheral register MPU that allows exclusive access to a peripheral for the transaction based on the safety privilege level.

13. The system of claim 1, wherein the CPU is configured to encode the safety privilege level as a device identifier associated with the transaction.

14. The system of claim 1, wherein the bus MPU is configured to grant access corresponding to one of read-only, write-only, and read/write.

15. The system of claim 7, wherein the CPU includes a register that stores the safety privilege level.

16. The system of claim 7, wherein the safety privilege level is a safety bit.

17. The system of claim 7, wherein the safety privilege level is a safety code.

18. The system of claim 7, wherein the CPU is configured to encode the safety privilege level as a device identifier associated with the transaction.

* * * * *